United States Patent [19]

McCormick

[11] Patent Number: 4,656,637
[45] Date of Patent: Apr. 7, 1987

[54] MULTIPLE RING LASER GYRO POWER SUPPLY

[75] Inventor: Willis G. McCormick, Redmond, Wash.

[73] Assignee: Sundstrand Data Control, Inc., Redmond, Wash.

[21] Appl. No.: 701,395

[22] Filed: Feb. 14, 1985

[51] Int. Cl.[4] .............................................. H01S 3/00
[52] U.S. Cl. ...................................... 372/38; 372/29; 372/33; 372/69; 315/312; 315/DIG. 7; 307/264
[58] Field of Search .................... 372/25, 26, 29, 30, 372/38, 81, 69, 94, 33; 315/312, DIG. 7, 171; 307/264, 268, 296

[56] References Cited

U.S. PATENT DOCUMENTS

| | | |
|---|---|---|
| 3,896,396 | 7/1975 | Whitehouse et al. ............... 372/38 |
| 3,928,819 | 12/1975 | Bernstein . |
| 4,009,385 | 2/1977 | Sell . |
| 4,017,763 | 5/1977 | Schermesser ........................ 372/38 |
| 4,061,986 | 12/1977 | Baker .................................. 372/38 |
| 4,160,934 | 7/1979 | Kirsch . |
| 4,168,427 | 9/1979 | Hubbard . |
| 4,238,707 | 12/1980 | Malissin et al. . |
| 4,282,495 | 8/1981 | Ljung . |
| 4,359,773 | 11/1982 | Swartz et al. . |
| 4,412,331 | 10/1983 | Chapman . |
| 4,430,738 | 2/1984 | Reif et al. ........................... 372/38 |
| 4,451,766 | 5/1984 | Angle et al. . |

FOREIGN PATENT DOCUMENTS 2029631A 3/1980 United Kingdom .

OTHER PUBLICATIONS

"Primary Regulated Dual Power Supply", A. Halperin, *IBM Technical Disclosure Bulletin*, vol. 21, No. 10 (Mar. 1979).

"Laser Power Supply", G. A. Beutel et al., *IBM Technical Bulletin*, vol. 21, No. 5, Oct. 1978.

Primary Examiner—Leon Scott, Jr.
Attorney, Agent, or Firm—Christensen, O'Connor, Johnson & Kindness

[57] ABSTRACT

Prior power supplies adapted to provide power to the lasers of multiple ring laser gyros were inefficient in that they were required to have power output capabilities far in excess of that required to sustain laser operations. Such inefficiency is greatly reduced by the present power supply comprising a DC power source (30) for producing a firing voltage at a first terminal (40) and a sustaining voltage at a second terminal (42), and interface means (50) associated with each laser (12, 13, 14) for coupling the laser to the first and second terminals. The firing voltage is capable of firing each laser, and the sustaining voltage is capable of sustaining current flow through each laser after firing. Each interface means comprises a resistor (52, 53, 54) connecting the laser to the first terminal and a diode (55, 56, 57) for connecting the laser to the second terminal such that the diode does not permit current flow between the first and second terminals.

8 Claims, 2 Drawing Figures

MULTIPLE RING LASER GYRO POWER SUPPLY

TECHNICAL FIELD

The present invention relates to a power supply for lasers and, in particular, to a single power supply capable of providing power to multiple ring laser gyros.

BACKGROUND OF THE INVENTION

In one type of inertial navigation system, three ring laser gyros are provided to sense rotations about three axes. In such a system, it would be desirable to utilize a single power supply to drive the three ring laser gyros. In general, a laser power supply must be capable of firing a laser, ie., of initiating current flow through a laser, and of sustaining current flow through the laser after it has fired. The voltage required to fire a laser is typically 2 to 3 times higher than the voltage required to sustain current once firing has occurred. Prior to firing, a laser presents essentially an open circuit to a power supply, whereas after firing, the voltage across the laser drops to a fixed value which is nearly independent of the laser current.

In the past, it has not been possible to reliably drive three lasers from a single power supply, because of small differences that invariably exist between the firing voltages of different lasers. If two or more lasers are connected to the same power supply, the production of a firing voltage by the power supply will cause the laser with the lowest firing voltage to fire first. When the first laser fires, the supply voltage will drop, thereby precluding the firing of the remaining lasers. One method of circumventing this problem is to use a power supply having a power output capability far in excess of that required to sustain operation of the lasers. However, this approach typically requires several attempts to start all lasers, and also results in large and potentially damaging input power surges when individual lasers fire.

SUMMARY OF THE INVENTION

The present invention provides a power supply capable of efficiently providing electrical power to a plurality of lasers each of which comprises the gas lasing means of a ring laser gyro. The power supply of the present invention is adapted such that the firing of one laser does not inhibit the firing of other lasers.

The power supply of the present invention comprises means for producing a firing voltage at a first terminal and a sustaining voltage at a second terminal, and interface means associated with each laser for coupling the laser to the first and second terminals. The firing voltage is capable of firing each laser by initiating current flow through that laser. The sustaining voltage is capable of sustaining current flow through each laser after the laser has fired. Each interface means comprises resistive means for connecting the laser to the first terminal, and diode means for connecting the laser to the second terminal in such a way that the diode means does not permit current flow between the first and second terminals when the terminals are at the firing and sustaining voltages, respectively. Each resistive means preferably comprises a resistor having a resistance value that is small enough so that the associated laser fires upon production of the firing voltage, and that is large enough so that after the laser fires, the principal part of the laser current flows through the diode means rather than through the resistor.

DETAILED DESCRIPTION OF THE INVENTION

Figure 1:
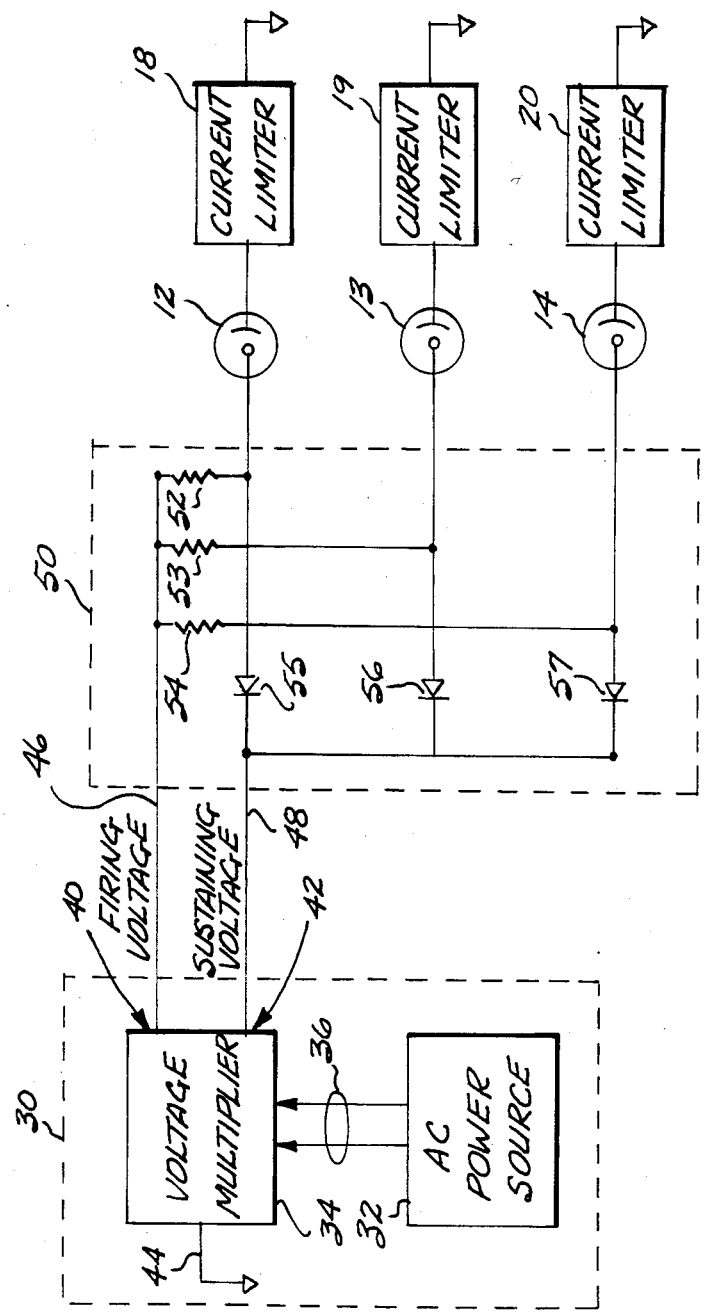
FIG. 1 is a block diagram of a power supply of the present invention connected to provide electrical power to three lasers.

FIG. 1 illustrates one preferred embodiment of the power supply of the present invention connected to supply electrical power to lasers 12, 13 and 14. Each laser 12-14 comprises the gas lasing means of a ring laser gyro that operates to sense rotation about a particular axis. Current limiters 18-20 are connected in series with lasers 12-14 respectively, the function of the current limiters being described below. Each current limiter is connected between the anode of its associated laser and a common ground potential.

The power supply of the present invention comprises DC power source 30 and interface network 50. DC power source 30 comprises AC power source 32 and voltage multiplier 34. The AC power source produces an AC signal on lines 36. Voltage multiplier 34 receives the AC signal and converts it into two essentially DC voltages, a firing voltage at terminal 40 and a sustaining voltage at terminal 42, both the firing and sustaining voltages being produced with reference to a common ground potential at terminal 44. The firing voltage is of sufficient magnitude to fire each laser, i.e. to initiate the flow of current through the laser. The sustaining voltage is of sufficient magnitude to sustain current through each laser after the laser has fired.

The firing and sustaining voltages are connected to interface network 50 by lines 46 and 48 respectively. The interface network comprises an interface circuit associated with each laser. The interface circuit associated with laser 12 comprises resistor 52 and diode 55. Resistor 52 is connected between laser 12 and the firing voltage on line 46. Diode 55 is connected between laser 12 and the sustaining voltage on line 48. Similar interface circuits are associated with lasers 13 and 14, the interface circuit associated with laser 13 comprising resistor 53 and diode 56, and the interface circuit associated with laser 14 comprising resistor 54 and diode 57. The orientation of each diode 55-57 is such that when the firing and sustaining voltages are applied to lines 46 and 48 respectively, the diodes do not permit current flow through the interface network between lines 46 and 48. Diodes 55-57 of FIG. 1 are therefore oriented for the case in which the firing and sustaining voltages are negative with respect to ground. If the firing and sustaining voltages were positive with repect to ground, then diodes 55-57 would be reversed in orientation. Each of diodes 55-57 preferably comprises a high-voltage rectifier capable of withstanding a reverse bias greater than the maximum firing voltage of any one of lasers 12-14.

The operation of the power supply of FIG. 1 can best be understood by means of a particular example. Assume that lasers 12, 13, and 14 have firing voltages of −3,000 volts, −3,100 volts and −3,200 volts respectively, and that after firing, the voltage drop across each laser will be approximately 600 volts and will be essentially independent of the laser current. Also assume that the current limiter associated with each laser functions to limit the current through that laser to 1 ma, such current being sufficient to sustain laser operation. Further assume that DC power source 30 is capable of providing a firing voltage of −3,300 volts, and that the DC power source produces a sustaining voltage equal to one-third of the firing voltage. Finally, assume that the value of each resistor 52–54 is 50 megohms. When the power supply is initially turned on, the voltage at terminal 40 and on line 46 will rapidly climb towards −3,300 volts, and the sustaining voltage on line 48 will climb at a corresponding rate towards −1,100 volts. When the firing voltage reaches −3,000 volts, laser 12 will fire. When laser 12 fires, the voltage across the laser will drop to about 600 volts, and the current through the laser will be limited to 1 ma by current limiter 18. The sustaining voltage on line 48 will at this time be −1,000 volts. The current drop across current limiter 18 will therefore be 400 volts, and the voltage drop across resistor 52 will be 2,000 volts. Since the resistance of resistor 52 is 50 megohms, the current through resistor 52 will be 0.04 ma. The balance of the 1 ma current through laser 12 (0.96 ma) will be supplied through line 48 and diode 55. Therefore the greater part of the current provided to the laser will be supplied through the low, sustaining voltage source, and only a small fraction of the current will be provided through the high, firing voltage source. This arrangement lessens the required power and significantly increases the efficiency of the power supply. For example, the power dissipation in this example immediately after laser 12 fires is 1.08 watts. In contrast, providing the entire 1 ma laser current from a 3,000 volt source would result in a power dissipation of 3 watts.

Continuing the above example, the firing voltage on line 46 will continue to rise after laser 12 has fired until it reaches −3,100 volts, at which time laser 13 will fire. The sustaining voltage on line 48 will at this time be equal to −1,033 volts, and the voltage drop across resistor 53 will be 2,067 volts. The current through resistor 53 will therefore be 0.041 ma, with the balance of the current to laser 13 (0.959 ma) being supplied through line 48 and diode 56. Therefore as with laser 12, the greater part of the current to laser 13 is provided from the lower sustaining voltage source, with only a minor amount of the current being provided through the higher firing voltage source, thereby reducing the required power.

When the firing voltage on line 46 reaches −3,200 volts, laser 14 will fire. The sustaining voltage on line 48 will at this time be equal to −1,067 volts, and the voltage drop across resistor 54 will be 2,133 volts. The current to resistor 54 will therefore be 0.043 ma, with the balance of the current to laser 14 (0.957 ma) being supplied through line 48 and diode 57. As with lasers 12 and 13, the greater part of the current to laser 14 is provided from the lower sustaining voltage source, with only a minor amount of the current being provided through the higher firing voltage source.

The resistance value of each resistor 52–54 should be low enough to permit firing of each laser upon production of the firing voltage on line 46. However, as indicated in the above example, the resistance value of each resistor is preferably sufficiently large such that after each laser fires, that laser draws the greater amount of its sustaining current from line 48 rather than from line 46. Preferably, the resistance value of each resistor is the largest value that will permit reliable firing of the lasers.

Figure 2:
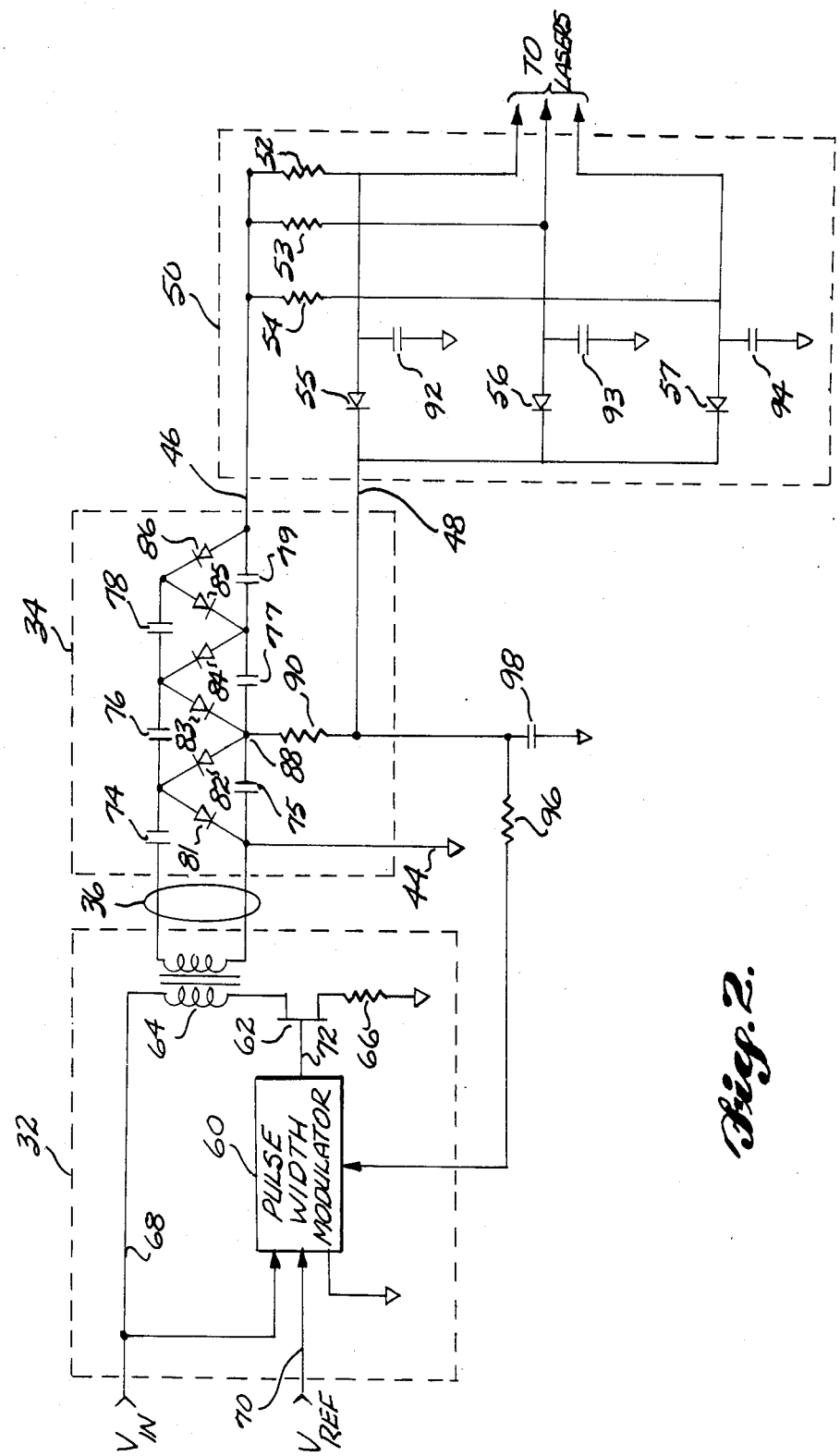
FIG. 2 is a more detailed circuit diagram of the power supply of FIG. 1.

FIG. 2 provides a more detailed illustration of one preferred embodiment of the present invention. For convenience, the same reference numerals are used for corresponding components in FIGS. 1 and 2. In the embodiment of FIG. 2, AC power source 32 comprises pulse width modulator 60, field effect transistor 62, transformer 64 and bias resistor 66. Pulse width modulator 60 responds to an input DC voltage $V_{IN}$ on line 68 and a DC reference voltage $V_{REF}$ on line 70 to produce a pulse signal on line 72. The pulse signal is coupled to the gate of field effect transistor 62, and causes the field effect transistor to switch the current through the primary winding of transformer 64 on and off. The resulting AC signal on the secondary winding of transformer 64 is coupled by lines 36 to voltage multiplier 34. In one preferred embodiment, the turns ratio of transformer 64 is selected such that a 550 volt (peak to peak) AC signal is produced on lines 36.

Voltage multiplier 36 consists of a conventional series multiplier comprising capacitors 74–79 and diodes 81–86. The series multiplier is connected to ground potential at terminal 44, and is operative to multiply the AC signal on lines 36 by a factor of 6 to produce the firing voltage on line 46. In the embodiment in which the amplitude of the AC signal on lines 36 is 550 volts, the firing voltage on line 46 will therefore be −3,300 volts. The sustaining voltage on line 48 is derived from node 88 of the series multiplier through resistor 90. The voltage at node 88 is twice the voltage applied to the voltage multiplier on lines 36, and is therefore equal to one-third of the firing voltage on line 46. A preferred value for each of capacitors 74 and 76–79 is 2,200 pF at 2 KV. A preferred value for capacitor 75 is 5,000 pF at 2 KV, the added capacitance provided by capacitor 75 operating in combination with resistor 90 to reduce ripple in the sustaining voltage. A suitable value for resistor 90 is 11 kilohms.

Interface network 50 of FIG. 2 is similar to the corresponding interface network of FIG. 1, except for the addition of capacitors 92–94 connecting the laser side of each diode 55–57 respectfully to ground. Capacitors 92–94 serve to reduce ripple in the sustaining voltage supplied to the lasers. A suitable value for each capacitor 92–94 is 2,200 pF at 5 KV.

The power supply of FIG. 2 also includes a feedback circuit comprising resistor 96 and capacitor 98. The feedback circuit connects the sustaining voltage level on line 48 back to pulse width modulator 60. As is well known to those skilled in the art, such feedback voltage can be used by the pulse width modulator to adjust the length of the pulses on line 72 so as to maintain the sustaining voltage at a preestablished level. Suitable values for resistor 96 and capacitor 98 are 20 megohms and 5,000 pF at 2 KV, respectively.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A power supply means for providing electrical power to a plurality of lasers, each laser containing a gas lasing means of a ring laser gyro, the power supply means comprising:

means for producing a firing voltage at a first terminal and a sustaining voltage at a second terminal, the firing voltage firing each laser by initiating current flow therethrough and the sustaining voltage sustaining current flow through each laser after the laser has fired; and interface means associated with each laser for coupling said laser to the first and second terminals, each interface means comprising resistive means for connecting said laser to the first terminal, and diode means for connecting said laser to the second terminal in such a way that the diode means does not permit current flow between said first and second terminals when said first terminal is at the firing voltage and said second terminal is at the sustaining voltage.

2. The power supply means of claim 1, wherein the resistance value of each resistive means is small enough so that said laser associated with that resistive means fires upon production of said firing voltage, said resistive value being large enough so that after the laser associated with that resistive means has fired, the greater part of the current to said laser flows through the diode means rather than through the resistive means.

3. The power supply means of claim 2, wherein each laser has associated with it a current limiter for limiting the current through said laser after said laser has fired.

4. The power supply means of claim 1, wherein each interface means comprises a capacitor connected between the laser side of the diode means and a common potential to reduce ripple in the sustaining voltage.

5. The power supply means of claim 1, wherein the means for producing the firing and sustaining voltages causes the ratio between the firing and sustaining voltages to be approximately equal to a constant.

6. The power supply means of claim 1, wherein the means for producing the firing and sustaining voltages comprises an AC power source producing an AC voltage signal, and a voltage multiplier rectifying and multiplying the AC voltage signal to produce the firing and sustaining voltages.

7. The power supply means of claim 6, wherein the voltage multiplier comprises a series voltage multiplier.

8. The power supply means of claim 6, further comprising feedback means for connecting the sustaining voltage to the AC power source, and wherein the AC power source is responsive to the sustaining voltage to adjust the AC voltage signal such that the sustaining voltage is maintained at a predetermined level.

* * * * *